(12) United States Patent
Dang

(10) Patent No.: US 7,929,489 B2
(45) Date of Patent: Apr. 19, 2011

(54) METHOD AND APPARATUS FOR DISCOVERING NETWORK SERVICE PROVIDER

(75) Inventor: Shujun Dang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 746 days.

(21) Appl. No.: 11/845,901

(22) Filed: Aug. 28, 2007

(65) Prior Publication Data

US 2007/0286120 A1 Dec. 13, 2007

Related U.S. Application Data

(63) Continuation of application No. PCT/CN2006/001625, filed on Jul. 10, 2006.

(30) Foreign Application Priority Data

Jul. 8, 2005 (CN) .......................... 2005 1 0035719

(51) Int. Cl.
*H04L 12/28* (2006.01)

(52) U.S. Cl. ........................................ 370/328; 370/254

(58) Field of Classification Search .................. 370/328, 370/338, 252, 254, 352, 471; 709/203, 220
See application file for complete search history.

(56) References Cited

U.S. PATENT DOCUMENTS

| 6,847,633 | B1 * | 1/2005 | Ryu et al. ....................... 370/352 |
| 2004/0117860 | A1 | 6/2004 | Yi et al. | |
| 2006/0223527 | A1 * | 10/2006 | Lee et al. ..................... 455/432.2 |

FOREIGN PATENT DOCUMENTS

| CN | 1459064 A | 11/2003 |
| CN | 1493034 A | 4/2004 |
| WO | PCT/EP2002/008631 A1 | 12/2003 |
| WO | WO 2004/002146 A1 | 12/2003 |
| WO | WO 2004/063406 A1 | 7/2004 |

OTHER PUBLICATIONS

IEEE Std 802.16—2004, IEEE Standard for Local and metropolitan area networks—Part 16: Air Interface for Fixed Broadband Wireless Access Systems, Jun. 24, 2004, IEEE-SA Standards Board.
State Intellectual Property Office of the People's Republic of China, First Examination Report in Chinese Patent Application No. CN200510035719.X (Apr. 11, 2008).
State Intellectual Property Office of the People's Republic of China, First Examination Report in Chinese Patent Application No. CN200680012283.5 (Sep. 26, 2008).

(Continued)

*Primary Examiner* — Brian D Nguyen
(74) *Attorney, Agent, or Firm* — Leydig, Voit & Mayer, Ltd.

(57) ABSTRACT

A method for discovering a network service provider, a network side transmitting apparatus and a network discovering apparatus for a user side device are disclosed. The method is used in a wireless communication network which includes a network access provider, a user side device and a network service provider. The method includes: issuing, by a network side, information that identifies a network access provider sharing mode; discovering the network service provider by the user side device in a manner corresponding to the information that identifies the network access provider sharing mode, when the user side device accesses the network. The present invention discovers a network service provider by incorporating different network access provider sharing modes into the existing wireless communication networks, and thus can utilize network resources effectively.

10 Claims, 7 Drawing Sheets

OTHER PUBLICATIONS

State Intellectual Property Office of the People's Republic of China, Second Examination Report in Chinese Patent Application No. CN200680012283.5 (Feb. 5, 2010).

State Intellectual Property Office of the People's Republic of China, Written Opinion of the International Searching Authority in International Patent Application No. PCT/CN2006/001625 ( )Nov. 23, 2006).

Wimax Forum Network Working Group, "Network discovery and selection," 050414-Network-Discovery-And-Selection.doc (May 14, 2004).

* cited by examiner

METHOD AND APPARATUS FOR DISCOVERING NETWORK SERVICE PROVIDER

CROSS-REFERENCES TO RELATED APPLICATIONS

The present application is a continuation of PCT Application No. PCT/CN2006/001625, filed on Jul. 10, 2006, which claims a priority to Chinese Patent Application No. 200510035719.X, filed on Jul. 8, 2005. All of these applications are incorporated herein by reference for all purposes.

FIELD OF THE INVENTION

The present invention relates to access technology in a wireless communication network, and more specifically, the present invention relates to a method and apparatus for discovering a network service provider when a user side device accesses a wireless communication network.

BACKGROUND OF THE INVENTION

As the development of wireless communication technology, new forms of wireless communication networks are continuously emerging, for example, currently fast-developed Worldwide Interoperability for Microwave Access Forum (WiMax) network, Wireless Local Area Network (WLAN) and so on. Generally, the wireless communication networks include user side devices, Network Access Providers (NAPs) operated by different operators, and Network Service Providers (NSPs). The WiMax network based on the Institute of Electrical and Electronics Engineers (IEEE) 802.16 standard, which can provide higher accessing rate, is used hereinafter as an example for illustration.

Referring to FIG. 1, it is a schematic diagram of the WiMax network reference model in non-roaming situation. In non-roaming situation, an Access Service Network (ASN) 110 is connected to a Connection Service Network (CSN) 120, and a Subscriber Station/Mobile Subscriber Station (SS/MSS) 130 accesses the CSN 120 via the ASN 110.

Referring to FIG. 2, it is a schematic diagram of the WiMax network reference model in roaming situation. In roaming situation, the ASN 110 is connected to a Visited CSN 121, and the Visited CSN 121 is connected to a Home CSN 122. The SS/MSS 130 is authenticated on the Home CSN 122 via the ASN 110 and the Visited CSN 121, and enjoys services provided by the Visited CSN 121 and the Home CSN 122.

Generally, the ASN is operated by the NAP and the CSN is operated by the NSP. In practical deployment, the NAP, a Visited NSP and a Home NSP may be operated by different operators, and the same area may be covered by several ASNs and each ASN may be connected with several NSPs. Currently, in the WiMax network, there are two different deployment modes: one is "NAP+NSP" mode, that is, there is an one-to-one correspondence between the NAPs and the NSPs; and another is "NAP+Sharing" mode, that is, one NAP has a roaming agreement with a plurality of NSPs and shared by the plurality of NSPs.

FIG. 3 shows a possible deployment mode in a WiMax network.

An ASN 111 of a NAP_4 and an ASN 112 of a NAP_6 both have coverage in the same area. A CSN 1201 of a NSP_1, a CSN 1202 of a NSP_2 and a CSN 1203 of a NSP_3 share the ASN 111 of the NAP_4. The ASN 112 of the NAP_6 is bound with a CSN 1204 of a NSP_6. An SS/MSS 131 and an SS/MSS 132 visit the network via the ASNs 111 and 112 respectively.

As for the mode in which the ASN is shared, a user side device may encounter an issue of how to know by which NSPs the current ASN is shared, that is, how to know which NSPs can be used through the current ASN. This is the NSP selection issue in a wireless communication network, that is, how does the network side provide currently available network information for the user side device, so that the user side device can select one NSP from the information of all accessible NSPs at the current position to access the network.

Currently, there are two mechanisms to discovering a NSP in a wireless communication network.

One mechanism is to derive information of an available NSP list mainly by using the "Operator ID" in a DL_MAP message. This mechanism is suitable for not only the "NAP+NSP" mode, but also the "NAP+Sharing" mode. For the "NAP+NSP" mode, it is convenient for the user side device to obtain information of the NSPs supported by the NAP according to the correspondence between the NAPs and NSPs. For the "NAP+Sharing" mode, however, the correspondence between the NAPs and NSPs is more complicated, and it is more difficult to be reflected in time in the user side device after being updated.

Another mechanism is the so-called dynamic NSP discovering mechanism. A Base Station (BS) broadcasts information of the NSPs supported by the current NAP, and the user side device receives relevant broadcasting messages to obtain information of the NSPs during initial scanning. Such a mechanism is more suitable for the "NAP+Sharing" mode, but for the "NAP+NSP" mode, it may cause waste of resources and time.

Moreover, since the broadcasting cycle of the relevant NSP information is long, it takes long time to wait in the NSP discovering. In addition, the relevant messages need to be broadcasted, and sometimes user side devices need to initiatively request for broadcasting messages, which will occupy uplink and downlink air interface resources.

Therefore, how to combine the above two mechanisms in existing wireless communication networks to utilize the network resources effectively is an issue in the art currently.

SUMMARY OF THE INVENTION

The present invention provides a method and apparatus for discovering a network service provider, which may improve the utilization ratio of network resources and efficiency of NSP discovering in conjunction with the currently available different NSP sharing modes.

The method for discovering a network service provider of the present invention is used to be utilized in a wireless communication network which includes a network access provider, a user side device and a network service provider. The method includes:

issuing, by a network side, information that identifies a network access provider sharing mode;

discovering the network service provider by the user side device in a manner corresponding to the information that identifies a network access provider sharing mode, when the user side device accesses the network.

The issuing by the network side information that identifies the network access provider sharing mode includes: carrying the information via a downlink message issued by the network work side.

Optionally, before the discovering the network service provider by the user side device, the method includes:

receiving, by the user side device, the downlink message issued by the network side;

obtaining a logic field of a network access provider identifier NAP_ID in the downlink message;

determining the network access provider sharing mode utilized by the network access provider according to the logic field of the network access provider identifier NAP_ID.

Optionally, before the discovering the network service provider by the user side device, the method includes:

receiving, by the user side device, the downlink message issued by the network side;

obtaining a message element that identifies the network access provider sharing mode in the downlink message;

determining the network access provider sharing mode utilized by the network access provider according to the message element that identifies the network access provider sharing mode.

The downlink message may be a downlink mapping message DL_MAP.

The network access provider sharing mode may include a "NAP+NSP" mode and a "NAP+Sharing" mode.

The discovering the network service provider corresponding to the "NAP+NSP" mode includes:

obtaining information of the network service provider supported by the network access provider according to a correspondence between the network access provider and the network service provider;

adding the obtained network service provider information into information of available network service providers.

The discovering the network service provider corresponding to the "NAP+Sharing" includes:

actively requesting or passively receiving information of the network service provider corresponding to the network access provider, wherein the information is issued by the network side;

adding the obtained information of the network service provider into the information of available network service providers.

The discovering the network service provider corresponding to the "NAP+Sharing" mode includes:

determining, by the user side device, whether there has been stored information of the network service provider corresponding to the current network access provider; if yes, obtaining the information of the network service provider corresponding to the network access provider stored by the user side device; otherwise, actively requesting or passively receiving the information of the network service provider corresponding to the network access provider issued by the network side.

The network side transmitting apparatus of the present invention includes:

an information transmitting apparatus, used to transmit, on the network side, information that identifies a network access provider sharing mode.

The information transmitting apparatus may include:

a message encapsulating apparatus, used to encapsulate the information that identifies the network access provider sharing mode into a downlink message to be issued by the network side.

Accordingly, the network discovering apparatus for a user side device of the present invention is used to be utilized in a wireless communication network which includes a network access provider, a user side device and a network service provider. The apparatus includes:

a receiving means, used to receive information issued by a network side that identifies a network access provider sharing mode, when the user side device accesses the network;

a discovering means, used to discover a network service provider in a manner corresponding to the information issued by the network side that identifies a network access provider sharing mode.

The receiving means includes:

a first message receiving unit, used to receive a downlink message issued by the network side;

a first obtaining unit, used to obtain a logic field of a network access provider identifier NAP_ID in the downlink message;

and the discovering means includes:

a first determining unit, used to determine the network access provider sharing mode utilized by the network access provider according to the logic field of the network access provider identifier NAP_ID;

a first discovering unit, used to discover the corresponding network service provider according to the determined network access provider sharing mode.

The first discovering unit includes:

a "NAP+NSP" mode discovering unit, used to obtain information of the network service provider supported by the network access provider according to a correspondence between the network access provider and network service provider, and add the obtained information of the network service provider into information of available network service providers;

a "NAP+Sharing" mode discovering unit, used to actively request or passively receive information of the network service provider corresponding to the network access provider issued by the network side, and add the obtained information of the network service provider into the information of available network service providers.

The receiving means includes:

a second message receiving unit, used to receive a downlink message issued by the network side for the user side device;

a second obtaining unit, used to obtain a message element in the downlink message that identifies the network access provider sharing mode;

and the discovering apparatus includes:

a second determining unit, used to determine the network access provider sharing mode utilized by the network access provider according to the message element that identifies the network access provider sharing mode;

a second discovering unit, used to discover the corresponding network service provider according to the determined network access provider sharing mode.

The second discovering unit includes:

a "NAP+NSP" mode discovering unit, used to obtain information of the network service provider supported by the network access provider according to a correspondence between the network access provider and network service provider, and add the obtained network service provider information into information of available network service providers; and a "NAP+Sharing" mode discovering unit, used to actively request or passively receive information of the network service provider corresponding to the network access provider issued by the network side, and add the obtained information of the network service provider information into the information of available network service providers.

Compared with the prior art, the present invention has the following advantages:

in the present invention, NSP discovering is performed in a manner corresponding to the information of the NAP sharing mode issued by the network side when the user side device accesses the network. Thus the user side device can perform NSP discovering according to different NAP sharing modes. For example, in the case that "NAP+NSP" mode can be utilized, the discovering is performed according to the correspondence. On one hand, it is possible to avoid message communication between the user side device and the network side to a great extent during the NSP discovering, so as to avoid extra consumption of air interface resources. On the other hand, in a normal situation, it can effectively reduce time consumption in the network discovering and selecting. Thus, it may greatly improve the utilization of network resources and the efficiency of NSP discovering.

DETAILED DESCRIPTION

The user side device referred to in the present invention is generally a mobile subscriber station (MSS) or a subscriber station (SS).

Generally, for a user side device to select a suitable network access, it needs to go through four stages as follows.

In a stage of discovering a NAP: the SS/MSS discovers all NAP networks accessible from its current position (the coverage areas of the NAP networks include the current position of the SS/MSS).

In a stage of discovering a NSP list for the current NAP: for each accessible NAP network, the NSPs which can be accessed through the NAP network are discovered.

In a stage of obtaining and selecting all currently available NSPs: all the NSPs that can be accessed by the SS/MSS from the current position are enumerated to form a list, and a suitable NSP is selected from the list according to a certain rule.

In a stage of accessing the network according to the selected NSP: a suitable NAP is selected (if a NSP may be accessed through two or more NAPs) according to the selected NSP and an initial accessing is performed.

The improvement of the present invention mainly relates to the above mentioned stage of discovering a NAP and the stage of discovering a NSP list for the current NAP.

Figure 1:
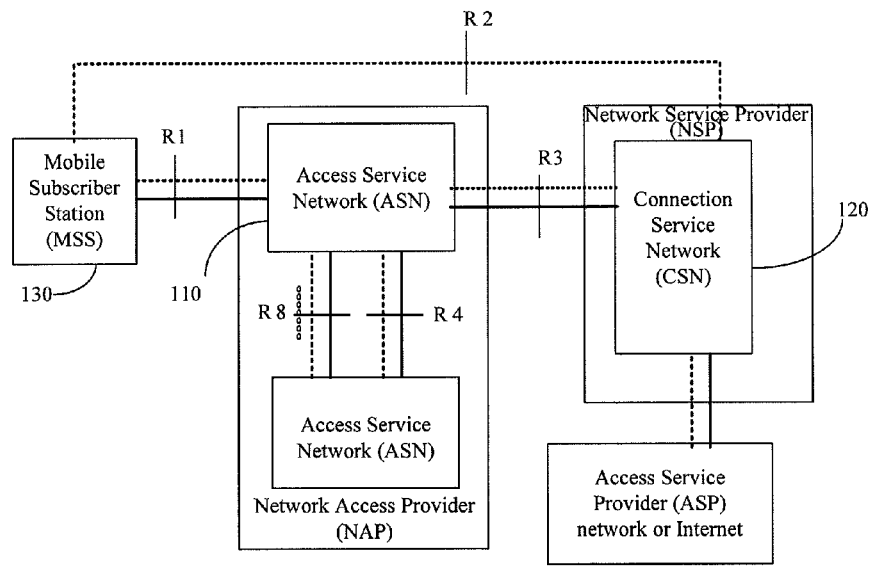
FIG. 1 is a schematic diagram of a WiMax network reference model in non-roaming situation in the prior art.
Figure 2:
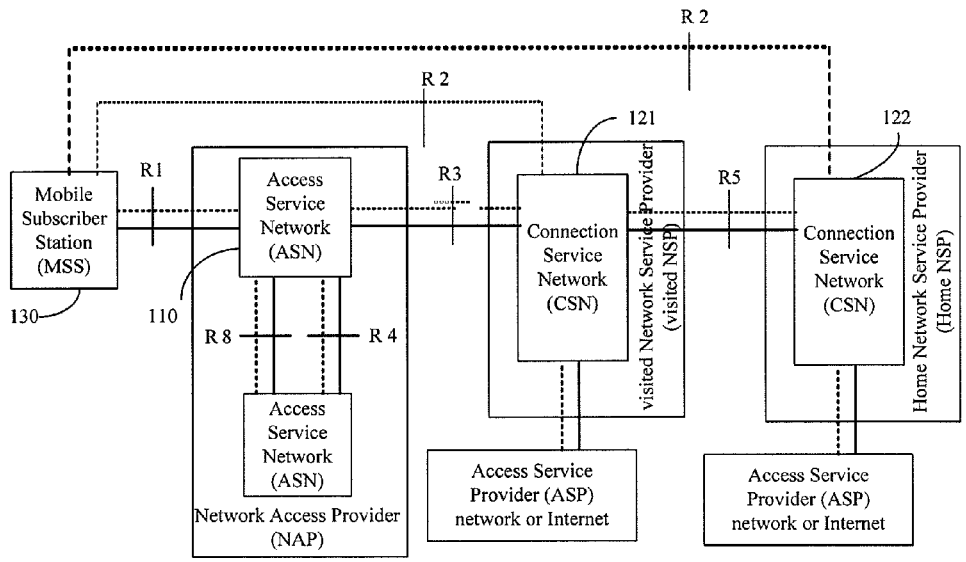
FIG. 2 is a schematic diagram of a WiMax network reference model in roaming situation in the prior art.
Figure 3:
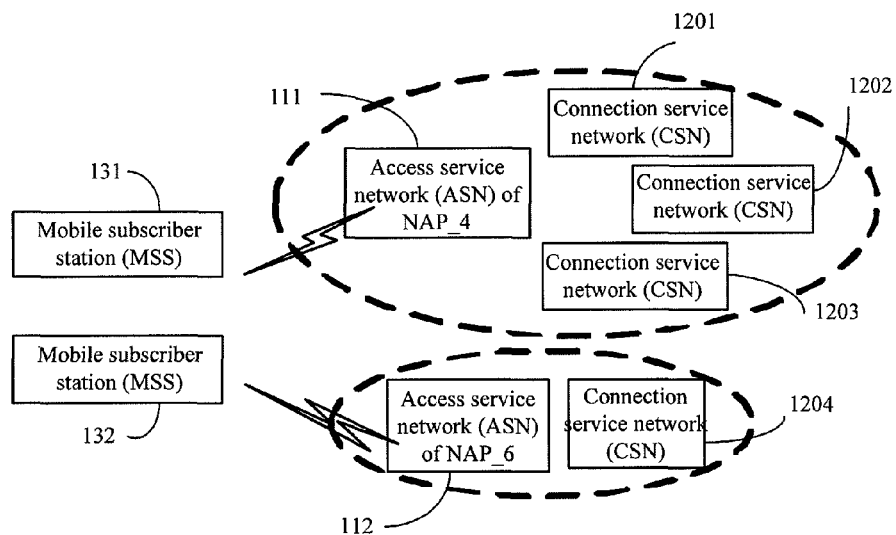
FIG. 3 is a schematic diagram of a WiMax network deployment mode in the prior art.
Figure 4:
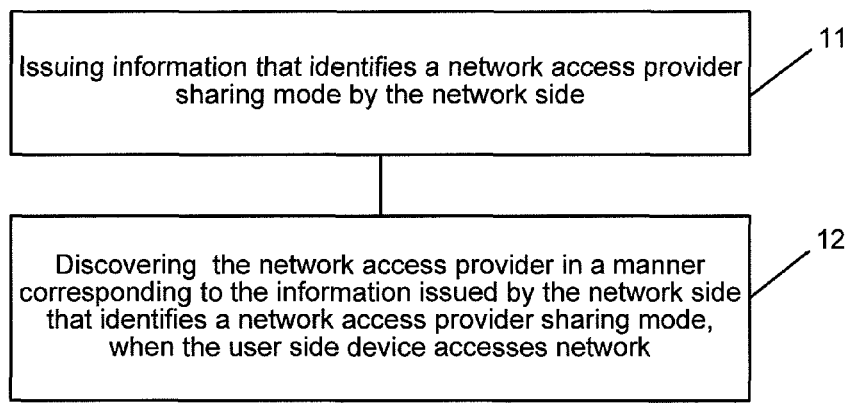
FIG. 4 is a flow chart for discovering a NSP according to the present invention.

Referring to FIG. 4, it is a flow chart of a method for discovering a NSP according to the present invention. The method mainly includes the steps as follows.

In Step 11, the network side issues information that identifies the network access provider sharing mode. According to a specific network situation, the information that identifies the network access provider sharing mode can be carried by a corresponding downlink message, such as a downlink mapping message DL_MAP issued by the network side, or other messages that can carry corresponding information, which will not be described here.

In Step 12, when the user side device accesses the network, the network service provider is discovered in a manner corresponding to the information of the network access provider sharing mode issued by the network side.

Now specific embodiments will be described for illustration.

Figure 5:
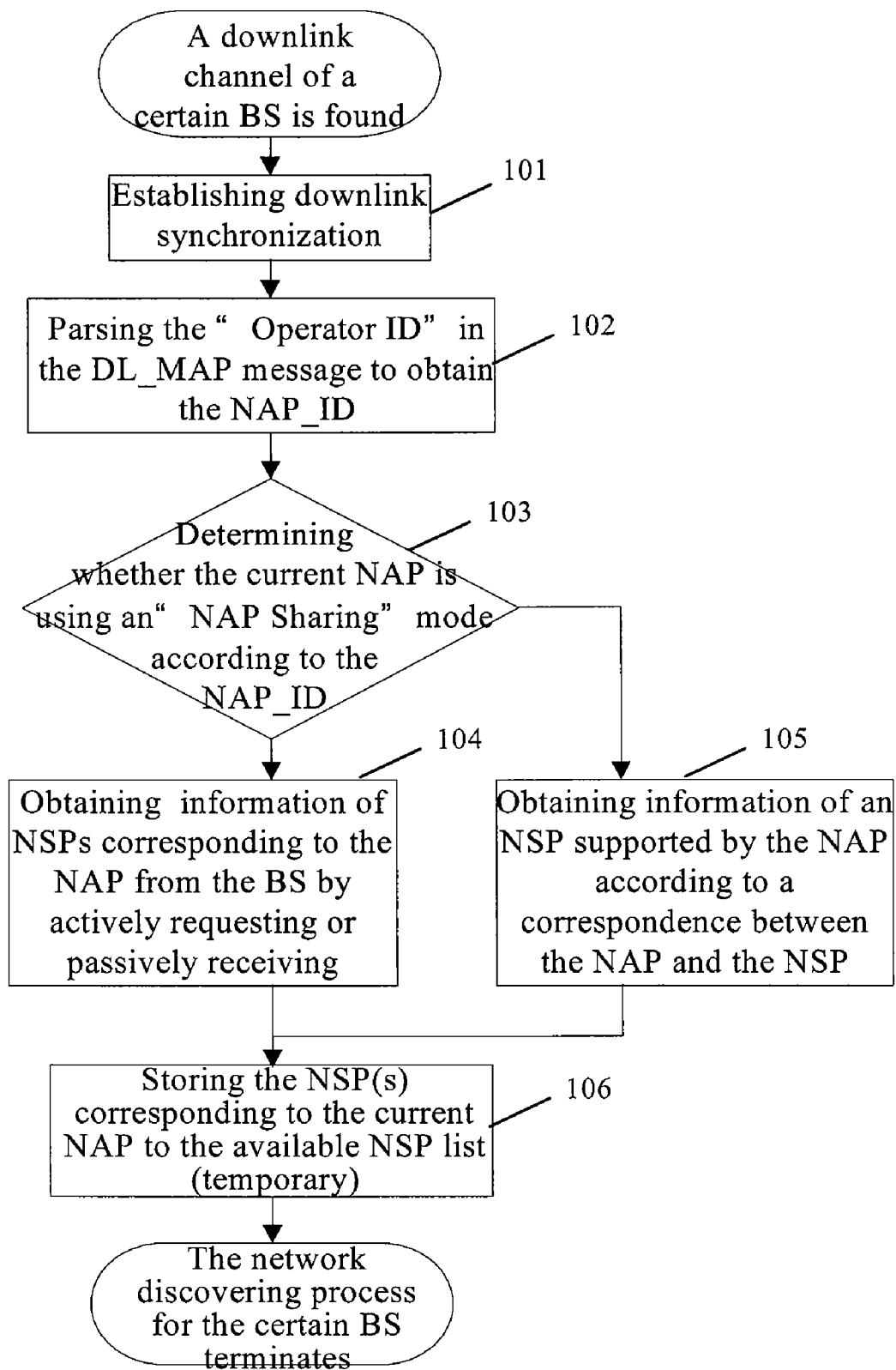
FIG. 5 is a flow chart of a first embodiment of the present invention.

Referring to FIG. 5, it is a flow chart of a first embodiment of the present invention.

In this embodiment, different values of a logic field of the network access provider identifier NAP_ID in the downlink mapping message DL_MAP are utilized to identify the network access provider sharing modes, that is, description on the structure of the logic field of the NAP_ID is introduced, so that the NAP_ID can reflect whether the NAP corresponding to the NAP_ID is using the "NAP+NSP" mode or the "NAP Sharing" mode. For example, when the first bit of the NAP_ID has a value of 0, it means that the "NAP+NSP" mode is used, and when the first bit of the NAP_ID has a value of 1, it means that the "NAP Sharing" mode is used.

When the SS/MSS performs a network discovering, it judges the relevant information in the NAP_ID. The specific process is as follows.

In Step 101, downlink synchronization is established.

In Step 102, a DL_MAP message is received, and information of the NAP_ID is obtained from "Operator ID".

In Step 103, it is determined according to the NAP_ID whether the current NAP uses the "NAP+NSP" mode or the "NAP Sharing" mode; if the "NAP Sharing" mode is used, the process proceeds to Step 104; otherwise, the process proceeds to Step 105.

In Step 104, information of NSPs corresponding to the NAP is obtained from a BS by actively requesting or passively receiving, and the process proceeds to Step 106.

In Step 105, the information of a NSP supported by the NAP is obtained according to the correspondence between the NAP and the NSP.

In Step 106, the NSP(s) corresponding to the current NAP is/are stored to an available NSP list (temporary), and the network discovering process for the BS terminates.

Figure 6:
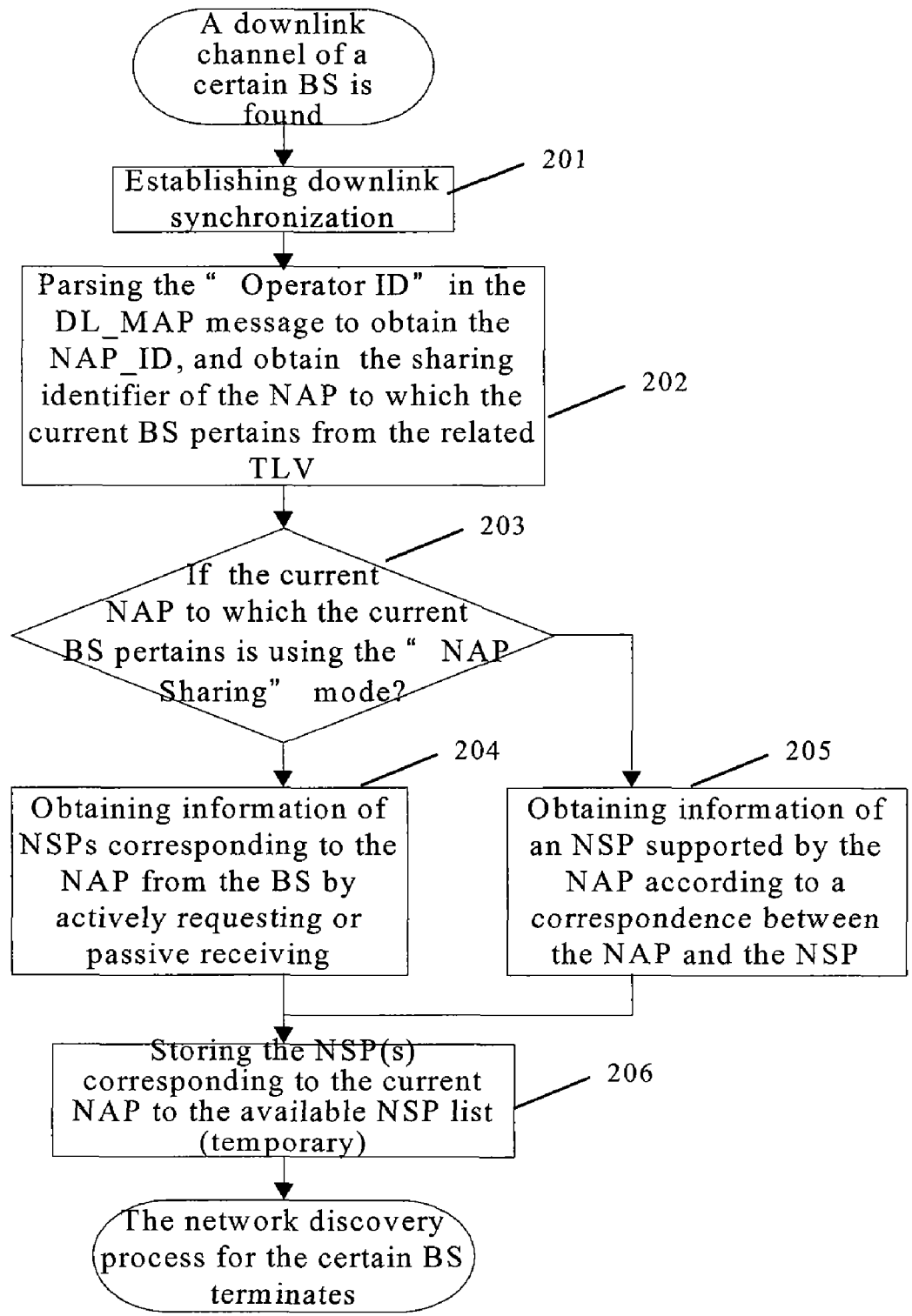
FIG. 6 is a flow chart of a second embodiment of the present invention.

Referring to FIG. 6, it is a flow chart of a second embodiment of the present invention.

In this embodiment, the message element which identifies the network access provider sharing mode is carried in the downlink mapping message DL_MAP, that is, a message element is added in the DL_MAP message. The message element can reflect whether the corresponding NAP uses "NAP+NSP" mode or "NAP Sharing" mode. For example, when a certain message element (TLV) is included in the DL_MAP message, it means that the "NAP sharing" mode is used, and when the corresponding message element is not included in the DL_MAP message, it means that the "NAP+NSP" mode is used.

When the SS/MSS performs network discovering, it judges relevant information in a DL_MAP message, and detailed process is as follows.

In Step 201, downlink synchronization is established.

In Step 202, the "Operator ID" in the DL_MAP message is parsed and the NAP_ID is obtained; a sharing identifier of the NAP to which a current BS pertains is obtained from a relevant TLV.

In Step 203, it is determined according to the NAP sharing identifier whether the current NAP uses the "NAP+NSP" mode or the "NAP Sharing" mode; if the "NAP Sharing" mode is used, the process proceeds to Step 204; otherwise, the process proceeds to Step 205.

In Step 204, information of NSPs corresponding to the NAP is obtained from the BS by actively requesting or passively receiving.

Step 205, information of a NSP supported by the NAP is obtained according to the correspondence between the NAP and the NSP.

Step 206, the NSP(s) corresponding to the current NAP is/are stored to an available NSP list (temporary), and the network discovering process for the BS terminates.

Figure 7:
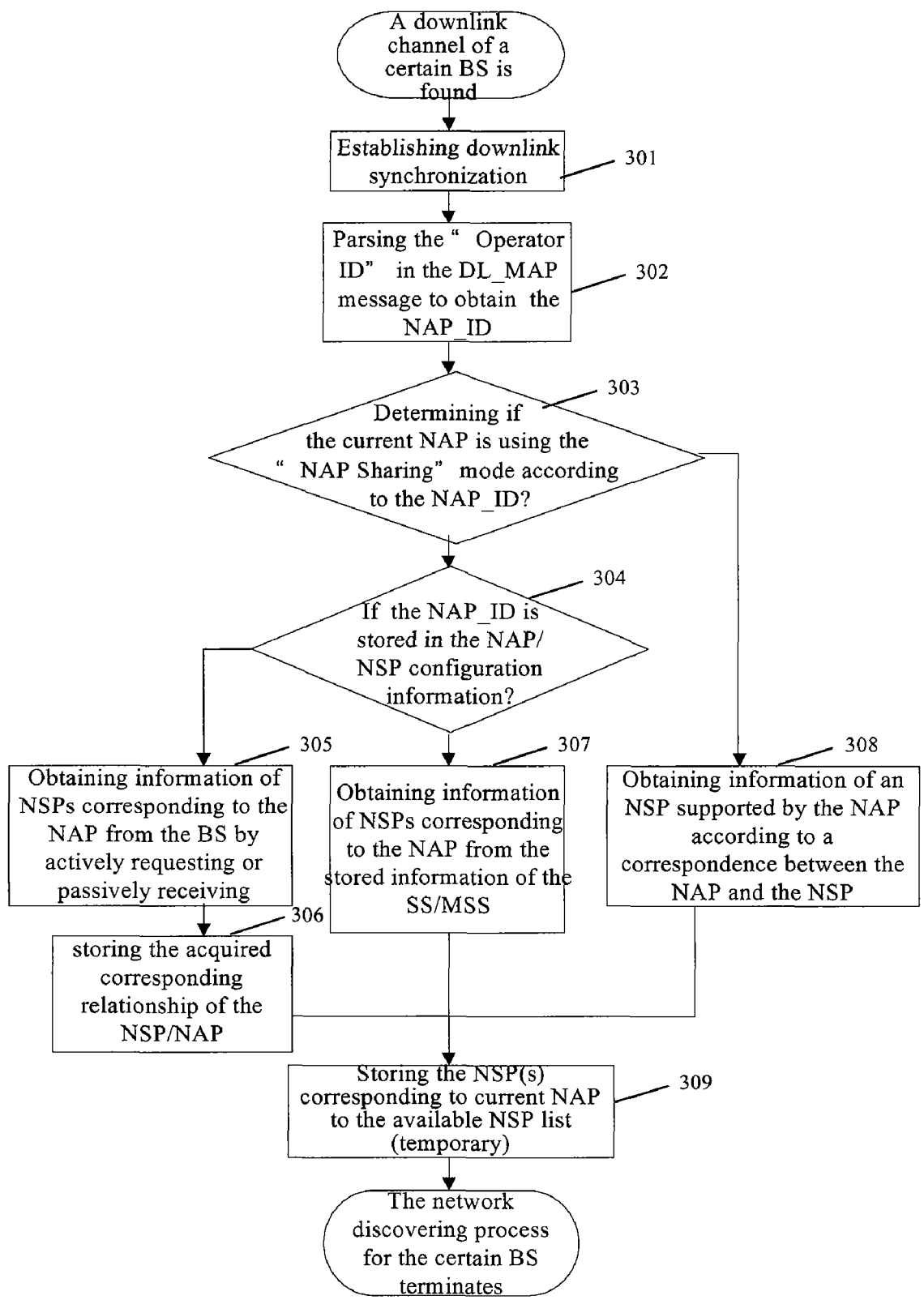
FIG. 7 is a flow chart of a third embodiment of the present invention.

Referring to FIG. 7, it is a flow chart of a third embodiment of the present invention.

Based on the first embodiment, it is further determined for the "NAP Sharing" mode whether there is information of the NSP list supported by the current NAP stored in the SS/MSS; if yes, use the stored list information; otherwise, receive relevant information from the network side.

When the SS/MSS performs network discovering, it judges the relevant information in the NAP_ID; in the "NAP Sharing" mode, it is determined whether the SS/MSS has stored the information of the NSP list supported by the current NAP. The detailed process is as follows.

In Step 301, downlink synchronization is established.

In Step 302, a DL_MAP message is received, and information of the NAP_ID is obtained from "Operator ID".

In Step 303, it is determined according to the NAP_ID whether the current NAP uses the "NAP+NSP" mode or "NAP Sharing" mode; if the "NAP Sharing" mode is used, the process proceeds to Step 304; otherwise, the process proceeds to Step 308.

In Step 304, it is determined whether the NAP_ID is stored in NAP/NSP configuration information; if not, the process proceeds to Step 305; otherwise, the process proceeds to Step 307.

In Step 305, information of NSPs corresponding to the NAP is obtained from the BS by actively requesting or passively receiving.

In Step 306, the obtained NSP/NAP correspondence is stored, and the process proceeds to Step 309.

In Step 307, information of NSPs corresponding to the ASN is obtained from the stored information in the SS/MSS, and the process proceeds to Step 309.

In Step 308, the information of a NSP supported by the NAP is obtained according to the correspondence between the NAP and the NSP, and the process proceeds to Step 309.

In Step 309, the NSP(s) corresponding to the current NAP is/are stored to an available NSP list (temporary), and the network discovering process for the BS terminates.

Figure 8:
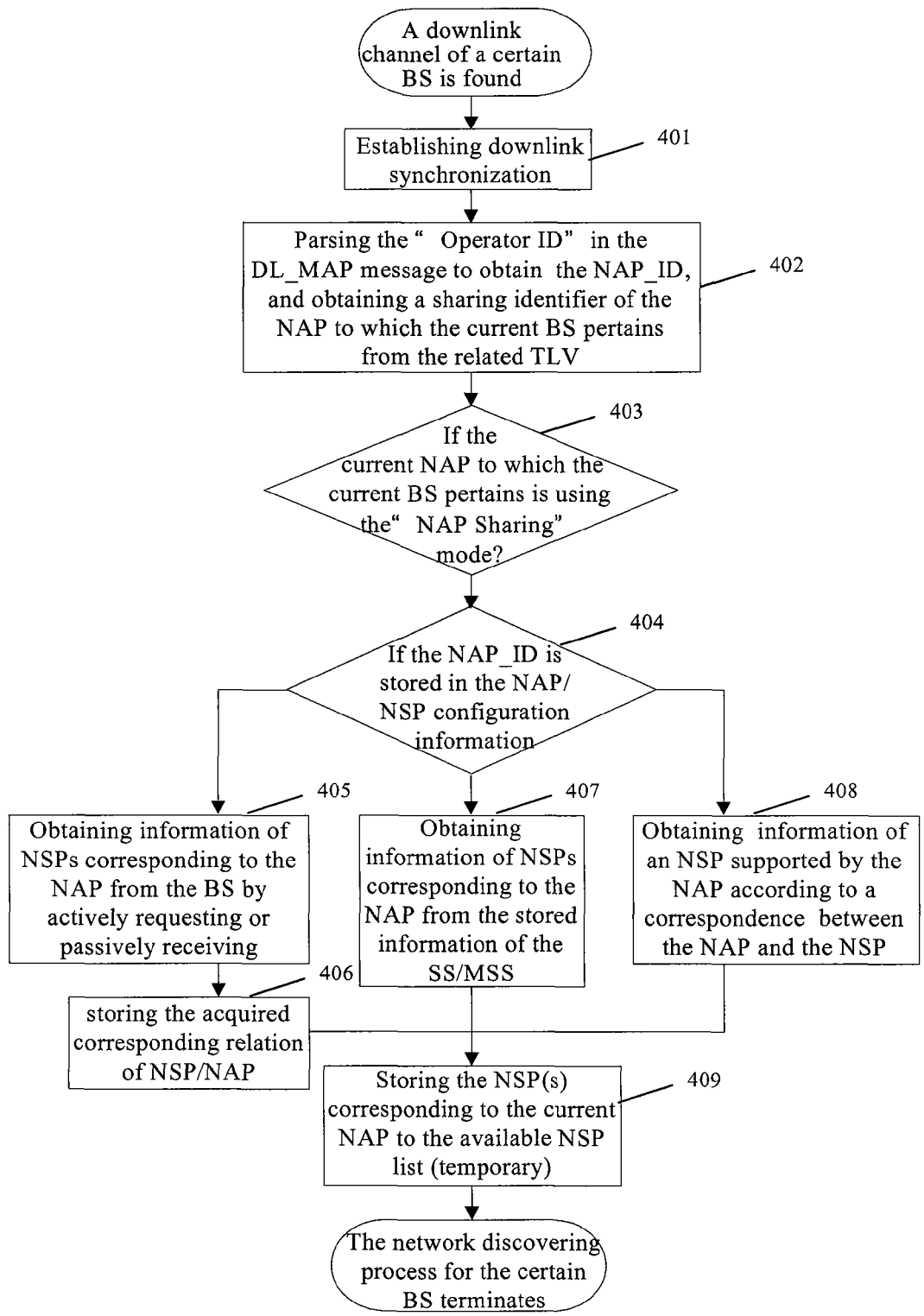
FIG. 8 is a flow chart of a fourth embodiment of the present invention.

Referring to FIG. 8, it is a flow chart of a fourth embodiment of the present invention.

Based on the second embodiment, it is further determined for the "NAP Sharing" mode whether there is information of the NSP list supported by the current NAP stored in the SS/MSS; if yes, use the stored list information directly; otherwise, receive relevant information from the network side.

When the SS/MSS performs network discovering, it judges the relevant information in an DL_MAP message; in the "NAP Sharing" mode, it is determined whether the SS/MSS has stored the information of the NSP list supported by the current NAP. The detailed process is as follows.

In Step 401, downlink synchronization is established.

In Step 402, the "Operator ID" in the DL_MAP message is parsed and the NAP_ID is obtained; the sharing identifier of the NAP to which the current BS pertains is obtained from a relevant TLV.

In Step 403, it is determined whether the current NAP is using the "NAP+NSP" mode or the "NAP Sharing" mode according to the sharing identifier of the NAP; if the "NAP Sharing" mode is used, the process proceeds to Step 404; otherwise, the process proceeds to Step 408.

In Step 404, it is determined whether the NAP_ID is stored in NAP/NSP configuration information; if not, the process proceeds to Step 405; otherwise, the process proceeds to Step 407.

In Step 405, information of NSPs corresponding to the NAP is obtained from the BS by actively requesting or passively receiving.

In Step 406, the obtained NSP/NAP correspondence is stored, and the process proceeds to Step 409.

In Step 407, information of NSPs corresponding to the ASN is obtained from the stored information in the SS/MSS, and the process proceeds to Step 409.

In Step 408, information of a NSP supported by the NAP is obtained according to the correspondence between the NAP and the NSP.

In Step 409, the NSP(s) corresponding to the current NAP is/are to the available NSP list (temporary), and the network discovering process for the BS terminates.

Figure 9:
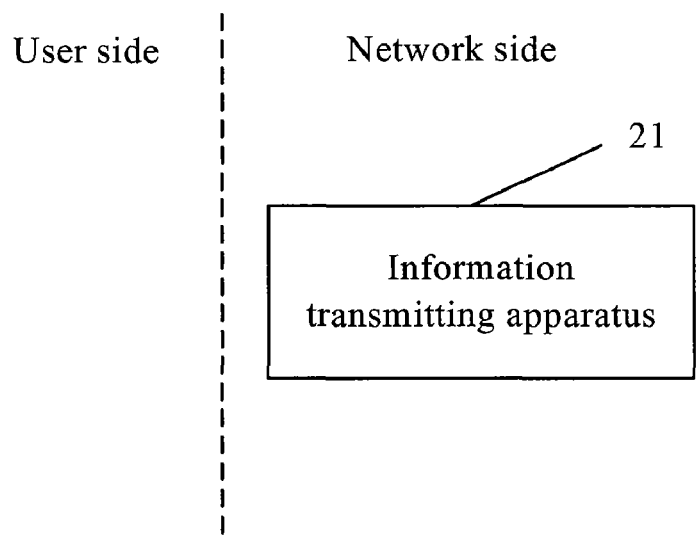
FIG. 9 is a schematic construction diagram of an embodiment of the network side transmitting apparatus of the present invention.

Referring to FIG. 9, it is a schematic construction diagram of an embodiment of the network side transmitting apparatus of the present invention.

The network side transmitting apparatus in the embodiment of the present invention includes:

an information transmitting apparatus 21, used to issue, on the network side, information that identifies a network access provider sharing mode.

In a specific implementation, the information that identifies a network access provider sharing mode can be packaged into a message, for example, can be carried by a DL_MAP message. The information transmitting apparatus 21 in the present invention may include:

a message encapsulating apparatus, used to encapsulate the information that identifies a network access provider sharing mode into a downlink message (for example, the DL_MAP message) to be issued by the network side.

Figure 10:
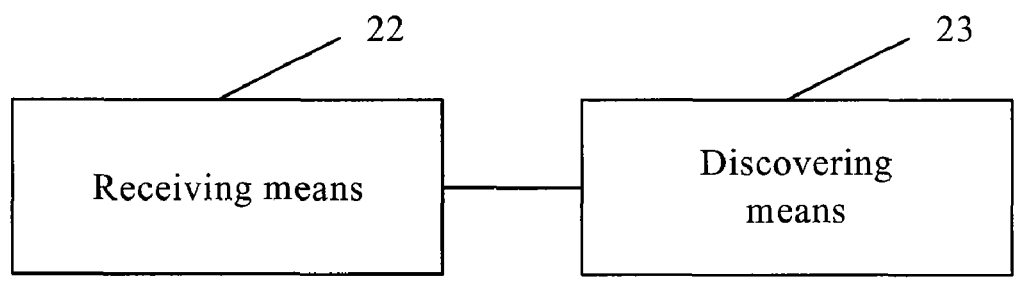
FIG. 10 is a schematic construction diagram of an embodiment of the user side network discovering of the present invention.

The network discovering apparatus for a user side device in the present invention will be illustrated below. Referring to FIG. 10, the network discovering apparatus for a user side device in the present invention mainly includes:

a receiving means 22, used to receive information issued by a network side that identifies a network access provider sharing mode, when the user side device accesses the network;

a discovering means 23, used to discover a network service provider in a manner corresponding to the information issued by the network side that identifies a network access provider sharing mode.

In a specific implementation, the receiving means 22 in an embodiment of the present invention may include:

a message receiving unit, used to receive a downlink message issued by the network side, wherein referring to the previous description, the downlink message in the present invention may be a downlink mapping message DL_MAP;

an obtaining unit, used to obtain a logic field of a network access provider identifier NAP_ID in the downlink message.

In addition, the discovering means 23 in the present invention may include:

a determining unit, used to determine a network access provider sharing mode utilized by the network access provider according to the logic field of the network access provider identifier NAP_ID;

a discovering unit, used to discover a corresponding network service provider according to the determined network access provider sharing mode.

In addition, in another embodiment of the present invention, the receiving means may include:

a second message receiving unit, used, for the user side device, to receive a downlink message issued by the network side;

a second obtaining unit, used to obtain a message element in the downlink message that identifies a network access provider sharing mode;

the discovering means includes:

a second determining unit, used to determine a network access provider sharing mode utilized by the network access provider according to the message element that identifies a network access provider sharing mode;

a second discovering unit, used to discover a corresponding network service provider according to the determined network access provider sharing mode.

In addition, for different network access provider sharing modes, the discovering unit of the present invention may include:

a "NAP+NSP" mode discovering unit, used to obtain information of a network service provider supported by the network access provider according to a correspondence between the network access provider and network service provider, and add the obtained network service provider information into information of available network service providers; and a "NAP+Sharing" mode discovering unit, used to actively request or passively receive information of network service providers corresponding to the network access provider, which information is issued by the network side, and add the obtained network service provider information into the information of available network service providers.

Above description is only preferred embodiments of the present invention, and they are not meant to limit the protect scope of the present invention. Any modifications, alternatives and improvements within the spirit and scope of the present invention should be included in the scope of the claims of the present invention.

What is claimed is:

1. A method for discovering a network service provider, used in a wireless communication network which comprises a network access provider, a user side device and a network service provider, comprising:

receiving, by the user side device, information that identifies a network access provider sharing mode via a downlink message issued by a network side, wherein the information comprises one of a logic field of a network access provider identifier (NAP_ID) and a message element that identifies the network access provider sharing mode;

obtaining, by the user side device, one of the logic field of the NAP_ID and the message element in the downlink message;

determining, by the user side device, the network access provider sharing mode utilized by the network access provider according to one of the logic field of the NAP ID and the message element; and discovering, by the user side device, the network service provider in a manner corresponding to the network access provider sharing mode, when the user side device accesses the network.

2. The method for discovering a network service provider according to claim 1, wherein the downlink message is a downlink mapping message (DL_MAP).

3. The method for discovering a network service provider according to claim 1, wherein the network access provider sharing mode comprises a "NAP+NSP" mode and a "NAP+Sharing" mode.

4. The method for discovering a network service provider according to claim 3, wherein when the network access provider sharing mode is the "NAP+NSP" mode, and the discovering the network service provider comprises:

obtaining information of the network service provider supported by the network access provider according to a correspondence between the network access provider and the network service provider; and adding the information of the network service provider into information of available network service providers.

5. The method for discovering a network service provider according to claim 3, wherein when the network access provider sharing mode is the "NAP+Sharing" mode, and the discovering the network service provider comprises:

actively requesting or passively receiving information of the network service provider corresponding to the network access provider, wherein the information is issued by the network side; and adding the information of the network service provider into information of available network service providers.

6. The method for discovering a network service provider according to claim 5, wherein the discovering the network service provider further comprises:

determining, by the user side device, whether there is stored information of the network service provider corresponding to a current network access provider;

if yes, obtaining the stored information of the network service provider corresponding to the current network access provider;

otherwise, actively requesting or passively receiving the information of the network service provider corresponding to the current network access provider issued by the network side.

7. A user side device, comprising:

a receiving means, configured to receive information issued by a network side that identifies a network access provider sharing mode, when the user side device accesses the network, wherein the information comprises a logic field of a network access provider identifier (NAP_ID) that identifies the network access provider sharing mode; and a discovering means, configured to discover a network service provider in a manner corresponding to the information issued by the network side that identifies a network access provider sharing mode;

wherein the receiving means comprises:

a message receiving unit, configured to receive a downlink message issued by the network side; and an obtaining unit, configured to obtain the logic field of the network access provider identifier NAP ID in the downlink message;

the discovering means comprises:

a determining unit, configured to determine the network access provider sharing mode utilized by a network access provider according to the logic field of the NAP ID; and a discovering unit, configured to discover the network service provider according to the determined network access provider sharing mode.

8. The user side device according to claim 7, wherein the discovering unit comprises:
   a "NAP+NSP" mode discovering unit, configured to obtain information of the network service provider supported by the network access provider according to a correspondence between the network access provider and the network service provider, and add the obtained information of the network service provider into information of available network service providers; and
   a "NAP+Sharing" mode discovering unit, configured to actively request or passively receive information of the network service provider corresponding to the network access provider issued by the network side, and add the obtained information of the network service provider into the information of available network service providers.

9. A user side device, comprising:
   a receiving means, configured to receive information issued by a network side that identifies a network access provider sharing mode, when the user side device accesses the network, wherein the information comprises a message element that identifies the network access provider sharing mode; and
   a discovering means, configured to discover a network service provider in a manner corresponding to the information issued by the network side that identifies a network access provider sharing mode;
   wherein the receiving means comprises:
   a message receiving unit, configured to receive a downlink message issued by the network side for the user side device; and
   a an obtaining unit, configured to obtain the message element in the downlink message that identifies the network access provider sharing mode;
   the discovering means comprises:
   a determining unit, configured to determine the network access provider sharing mode utilized by a network access provider according to the message element that identifies the network access provider sharing mode; and
   a second discovering unit, configured to discover the network service provider according to the determined network access provider sharing mode.

10. The user side device according to claim 9, wherein the discovering unit comprises:
   a "NAP+NSP" mode discovering unit, configured to obtain information of the network service provider supported by the network access provider according to a correspondence between the network access provider and the network service provider, and add the obtained network service provider information into information of available network service providers; and
   a "NAP+Sharing" mode discovering unit, configured to actively request or passively receive information of the network service provider corresponding to the network access provider issued by the network side, and add the obtained information of the network service provider into the information of available network service providers.

* * * * *

UNITED STATES PATENT AND TRADEMARK OFFICE
CERTIFICATE OF CORRECTION

PATENT NO. : 7,929,489 B2
APPLICATION NO. : 11/845901
DATED : April 19, 2011
INVENTOR(S) : Shujun Dang Page 1 of 1

It is certified that error appears in the above-identified patent and that said Letters Patent is hereby corrected as shown below:

Column 9, lines 66-67, "NAP ID" should read -- NAP_ID --.

Column 10, line 61, "NAP ID" should read -- NAP_ID --.

Column 10, line 67, "NAP ID" should read -- NAP_ID --.

Column 12, line 4, "a an obtaining unit" should read -- an obtaining unit --.

Column 12, line 13, "a second discovering unit" should read -- a discovering unit --.

Signed and Sealed this
Seventh Day of June, 2011

David J. Kappos
*Director of the United States Patent and Trademark Office*